United States Patent
Latimer et al.

(10) Patent No.: US 11,333,026 B2
(45) Date of Patent: May 17, 2022

(54) VIBRATION-DAMPING SYSTEM FOR TURBOMACHINE BLADE(S) ON SPACER ADJACENT BLADE STAGE

(71) Applicant: General Electric Company, Schenectady, NY (US)

(72) Inventors: Jeremy Peter Latimer, Greenville, SC (US); Patrick Daniel Noble, Seattle, WA (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 16/883,158

(22) Filed: May 26, 2020

(65) Prior Publication Data
US 2021/0372287 A1  Dec. 2, 2021

(51) Int. Cl.
*F01D 5/22* (2006.01)

(52) U.S. Cl.
CPC ............ *F01D 5/22* (2013.01); *F05D 2240/30* (2013.01); *F05D 2260/96* (2013.01)

(58) Field of Classification Search
CPC ..... F01D 5/22; F05D 2240/30; F05D 2260/96
See application file for complete search history.

(56) References Cited

U.S. PATENT DOCUMENTS

| | | |
|---|---|---|
| 4,347,040 A | 8/1982 | Jones et al. |
| 5,205,713 A | 4/1993 | Szpunar et al. |
| 5,215,442 A | 6/1993 | Steckle et al. |
| 5,226,784 A * | 7/1993 | Mueller ............... F01D 5/22 416/248 |
| 5,820,346 A | 10/1998 | Young et al. |
| 9,664,058 B2 | 5/2017 | Healy et al. |
| 9,777,586 B2 | 10/2017 | Healy et al. |
| 9,896,946 B2 | 2/2018 | Noble |
| 2014/0079529 A1 | 3/2014 | Kareff et al. |
| 2016/0186591 A1 | 6/2016 | Healy et al. |
| 2016/0298546 A1 | 10/2016 | Edwards |
| 2016/0348514 A1 * | 12/2016 | Winn .................. F01D 5/28 |
| 2017/0022819 A1 * | 1/2017 | Weinert ................ F01D 5/22 |

(Continued)

FOREIGN PATENT DOCUMENTS

EP        2884049 B1     6/2015

OTHER PUBLICATIONS

International Search Report for corresponding EP Application No. 21172593.2 dated Nov. 9, 2021, 13 pgs.

*Primary Examiner* — Aaron R Eastman
(74) *Attorney, Agent, or Firm* — Charlotte Wilson; Hoffman Warnick LLC

(57) ABSTRACT

A vibration-damping system for turbomachine blade(s) in a turbomachine is provided. Each turbomachine blade includes a platform having a radially inner surface. The system includes a spacer axially adjacent the platform of at least one turbomachine blade in the turbomachine, e.g., adjacent a turbomachine blade stage. The spacer includes a body. A damping element coupler is on the body of the spacer, and a vibration-damping element is configured to couple to the damping element coupler. The vibration-damping element and the damping element coupler are disposed to cause the vibration-damping element to engage the radially inner surface of the platform of the turbomachine blade(s) to dampen vibration of the turbomachine blade(s), e.g., during operation of the turbomachine.

16 Claims, 7 Drawing Sheets

(56) References Cited

U.S. PATENT DOCUMENTS

| | | | |
|---|---|---|---|
| 2017/0037734 A1* | 2/2017 | Chakrabarti | F01D 25/06 |
| 2017/0067348 A1 | 3/2017 | Kareff et al. | |
| 2018/0058236 A1* | 3/2018 | Banks | F01D 5/08 |
| 2019/0186270 A1* | 6/2019 | Joly | F01D 5/10 |
| 2019/0186276 A1* | 6/2019 | Joly | F01D 25/06 |
| 2019/0345830 A1* | 11/2019 | Pesaresi | F01D 5/22 |
| 2021/0062659 A1* | 3/2021 | Duong | F01D 11/006 |
| 2021/0079794 A1* | 3/2021 | Joly | F01D 5/22 |

* cited by examiner

VIBRATION-DAMPING SYSTEM FOR TURBOMACHINE BLADE(S) ON SPACER ADJACENT BLADE STAGE

BACKGROUND

The disclosure relates generally to damping vibration in an industrial machine. More particularly, the disclosure relates to the damping of blades used in turbomachines using a vibration-damping system coupled to a spacer adjacent a blade stage.

One concern in turbomachine operation is the tendency of the blades to undergo vibrational stress during operation. In many installations, turbomachines are operated under conditions of frequent acceleration and deceleration. During acceleration or deceleration of the turbomachine, the blades are, momentarily at least, subjected to vibrational stresses at certain frequencies and, in many cases, are subjected to vibrational stresses at secondary or tertiary frequencies. Blades may also vibrate during steady-state operations. When a blade is subjected to vibrational stress, its amplitude of vibration can readily build up to a point which may alter operations.

In one example, a compressor within an axial flow turbomachine system generally includes a rotor assembly comprising a rotor disk and a plurality of blades circumferentially disposed around the rotor disk. Each blade includes a base (or root), an airfoil, and a platform positioned in the transition area between the base and the airfoil. The bases of the blades are received in complementary shaped recesses within the rotor disk. The platforms of the blades extend laterally outward and collectively form a flowpath for working fluid passing through the rotor stage. The forward edge of each blade is generally referred to as the leading edge, and the aft edge as the trailing edge. "Forward" is defined as being upstream of "aft" in the gas flow through the system.

During operation, blades may be excited into vibration by a number of different forcing functions. Variations in gas temperature, pressure, and/or density, for example, can excite vibrations throughout the rotor assembly, especially within the blade airfoils. Gas experiences a periodic, or "pulsating," flow that can also excite undesirable vibrations.

Blades can be damped against vibration in a number of ways. Current approaches may be categorized as: single-blade alone approaches, blade-to-blade approaches, blade-to-rotor disk approaches, and passive approaches. In single-blade approaches, dampers may be attached to an external surface of the airfoil. A recognized disadvantage of adding a damper to an external surface is that the damper is exposed to the harsh, corrosive environment within the engine. As soon as the damper begins to corrode, its effectiveness may be compromised. In addition, the damper may separate from the airfoil because of corrosion. In terms of blade-to-blade approaches, various physical structures of the blades can be altered to reinforce the blades against the vibrations. For example, mid-span shrouds that couple adjacent blades may be used. Changing or adding structure to the blade(s) creates additional challenges by changing the aerodynamic performance of the blades and adding weight and/or length. Blades may also be damped by structure that engages platforms of adjacent blades, e.g., damping pins. The single-blade and blade-to-blade approaches may not provide grounding for the vibrations, which significantly reduces damper effectiveness during an in-phase vibratory response.

Blades may also be vibrationally damped using a blade-to-rotor disk approach. In this format, a damping element engages against an underside of platforms or against shanks of adjacent blades. The damping elements couple to the rotor disk. These arrangements are typically very complicated to install and/or repair because they must fit between the shanks and/or platforms of adjacent blades.

Mechanisms to passively absorb pressure that creates the vibrations during use are also employed. In one example, cavities or, in another example, baffles, may be provided adjacent an outer tip of the blade to absorb pressure variations during operation. In another case, a high-pressure airflow may be directed from an upstream position into a leading edge of a blade stage.

BRIEF DESCRIPTION

A first aspect of the disclosure provides a vibration-damping system for at least one turbomachine blade in a turbomachine, each turbomachine blade having a platform having a radially inner surface, the system including: a spacer axially adjacent the platform of the at least one turbomachine blade in the turbomachine; a damping element coupler positioned on the body of the spacer; and a vibration-damping element configured to couple to the damping element coupler, wherein the vibration-damping element and the damping element coupler are disposed to cause the vibration-damping element to engage the radially inner surface of the platform of the at least one turbomachine blade to dampen vibration of the at least one turbomachine blade.

A second aspect of the disclosure provides a spacer for positioning adjacent a turbomachine blade stage in a turbomachine, the spacer including: a body; a dovetail on the body; and a vibration-damping element coupler on the body, the vibration-damping element coupler disposed to position a vibration-damping element to engage a radially inner surface of a platform of at least one turbomachine blade in the turbomachine blade stage to dampen vibration of the at least one turbomachine blade.

A third aspect of the disclosure provides a vibration-damping element for a pair of circumferentially adjacent turbomachine blades in a turbomachine, each turbomachine blade having a platform having a radially inner surface, the vibration-damping element having: a U-shaped body having a first leg and a second leg extending from a base portion that couples the first and second legs, the U-shaped body defining a receiver for coupling the U-shaped body to a dampening element coupler disposed on a body of a spacer axially adjacent the pair of circumferentially adjacent turbomachine blades in the turbomachine; and a first bearing surface on the base portion and configured to engage with the radially inner surfaces of each turbomachine blade, wherein the first bearing surface is oriented at a non-parallel angle relative to a rotor axis of the turbomachine.

A fourth aspect of the disclosure includes a method that includes: coupling a vibration-damping element to a body of a spacer axially adjacent a pair of circumferentially adjacent turbomachine blades in a turbomachine, the vibration-damping element extending adjacent to a radially inner surface of each platform of the pair of circumferentially adjacent turbomachine blades; and, during operation of the turbomachine, damping vibration of the pair of circumferentially adjacent turbomachine blades by engaging the vibration-damping element to the radially inner surface of each platform of the pair of circumferentially adjacent turbomachine blades and engaging the vibration-damping element to the body of the spacer axially adjacent the pair of circumferentially adjacent turbomachine blades.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
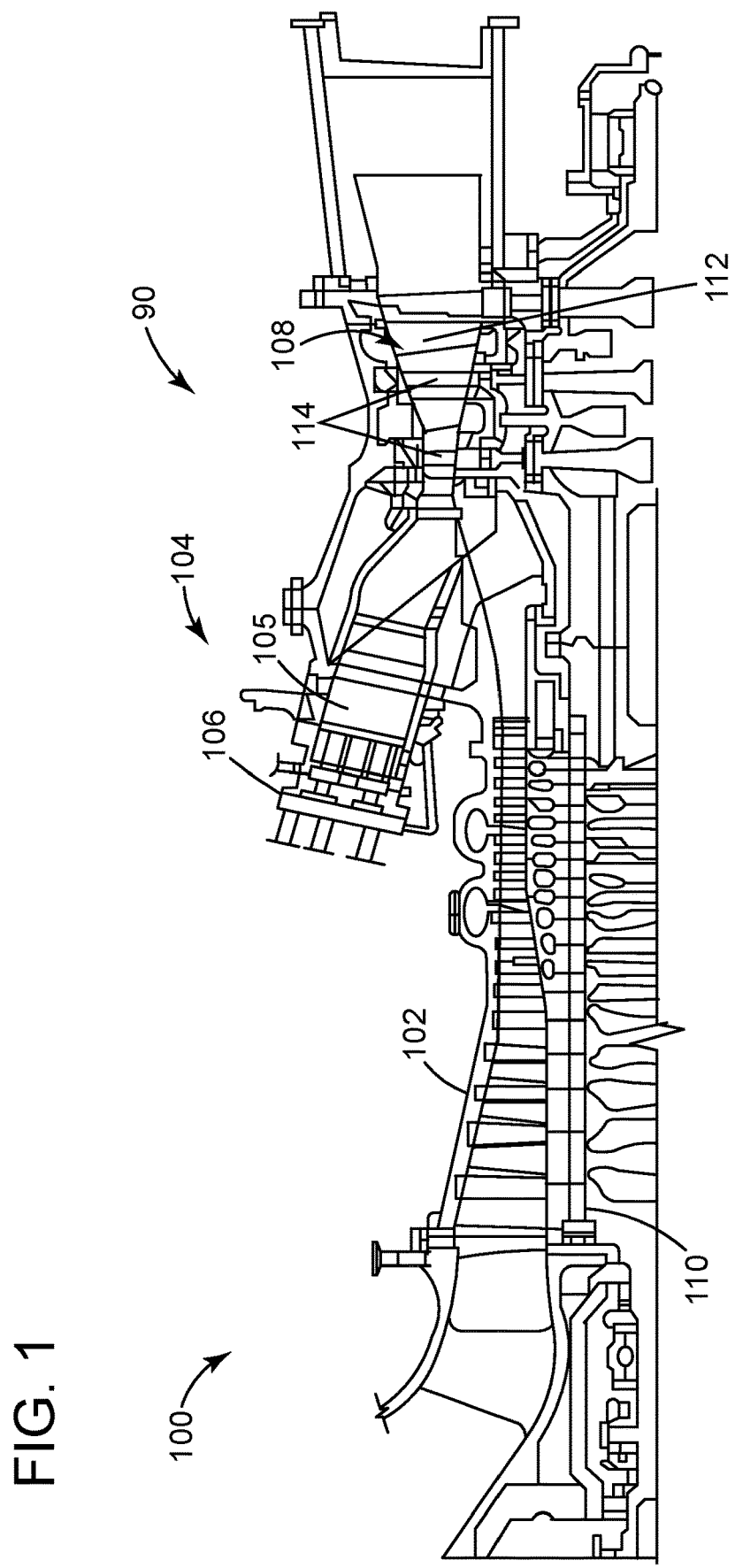
FIG. 1 shows a schematic view of an illustrative turbomachine in the form of a gas turbine; system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. It is recognized that in an opposed flow configuration, upstream and downstream directions may change depending on where one is in the turbomachine. The terms "forward" and "aft," without any further specificity, refer to directions, with "forward" referring to the front end of the turbomachine, and "aft" referring to the rearward section of the turbomachine.

It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbomachine system, e.g., an axis of a rotor thereof.

In addition, several descriptive terms may be used regularly herein, as described below. The terms "first", "second", and "third" may be used interchangeably to distinguish one component from another and are not intended to signify location or importance of the individual components.

Embodiments of the disclosure provide, among other things, a vibration-damping system for turbomachine blade(s) in a turbomachine, e.g., a compressor. Each turbomachine blade includes a platform having a radially inner surface. The system includes a spacer axially adjacent the platform of the at least one turbomachine blade in the turbomachine, e.g., adjacent a turbomachine blade stage. The spacer includes a body and may include a gaspath facing surface forming a portion of an annulus for a working fluid flowpath. A damping element coupler is positioned on the body of the spacer, and a vibration-damping element is configured to couple to the damping element coupler. The vibration-damping element and the damping element coupler are disposed to cause the vibration-damping element to engage the radially inner surface of the platform of the turbomachine blade(s) to dampen vibration of the turbomachine blade(s), i.e., during operation of the turbomachine. The vibration-damping element frictionally damps vibration of turbomachine blade(s) and damps vibration to ground through the spacer to the rotor disk. The vibration-damping system may also frictionally damp vibrations between adjacent blades for an out-of-phase vibratory response. The vibration-damping system including the vibration-damping elements reduces blade vibration with a simple arrangement and does not require a change in blade configuration.

Referring to the drawings, FIG. 1 is a schematic view of an illustrative turbomachine(s) to which teachings of the disclosure can be applied. In FIG. 1, a turbomachine 90 in the form of a combustion turbine or gas turbine (GT) system 100 (hereinafter, "GT system 100") is shown. GT system 100 includes a compressor 102 and a combustor 104. Combustor 104 includes a combustion region 105 and a fuel nozzle section 106. GT system 100 also includes a turbine 108 and a common compressor/turbine shaft 110 (hereinafter referred to as "rotor 110"). The present disclosure is not limited to any one particular GT system and may be implemented in connection with other engines including, for example, the other HA, F, B, LM, GT, TM and E-class engine models of General Electric Company and engine models of other companies. While embodiments of the disclosure will be described relative to turbomachine blades in the form of compressor blades in compressor 102, the teachings of the disclosure are not necessarily applicable to only a compressor and may be applied to practically any type of turbomachine or turbomachine section, e.g., steam turbines, jet engines, gas turbines (like 108 in FIG. 1), turbofans, turbochargers, etc. Hence, reference to compressor 102 is merely for descriptive purposes, and is not limiting.

Figure 2:
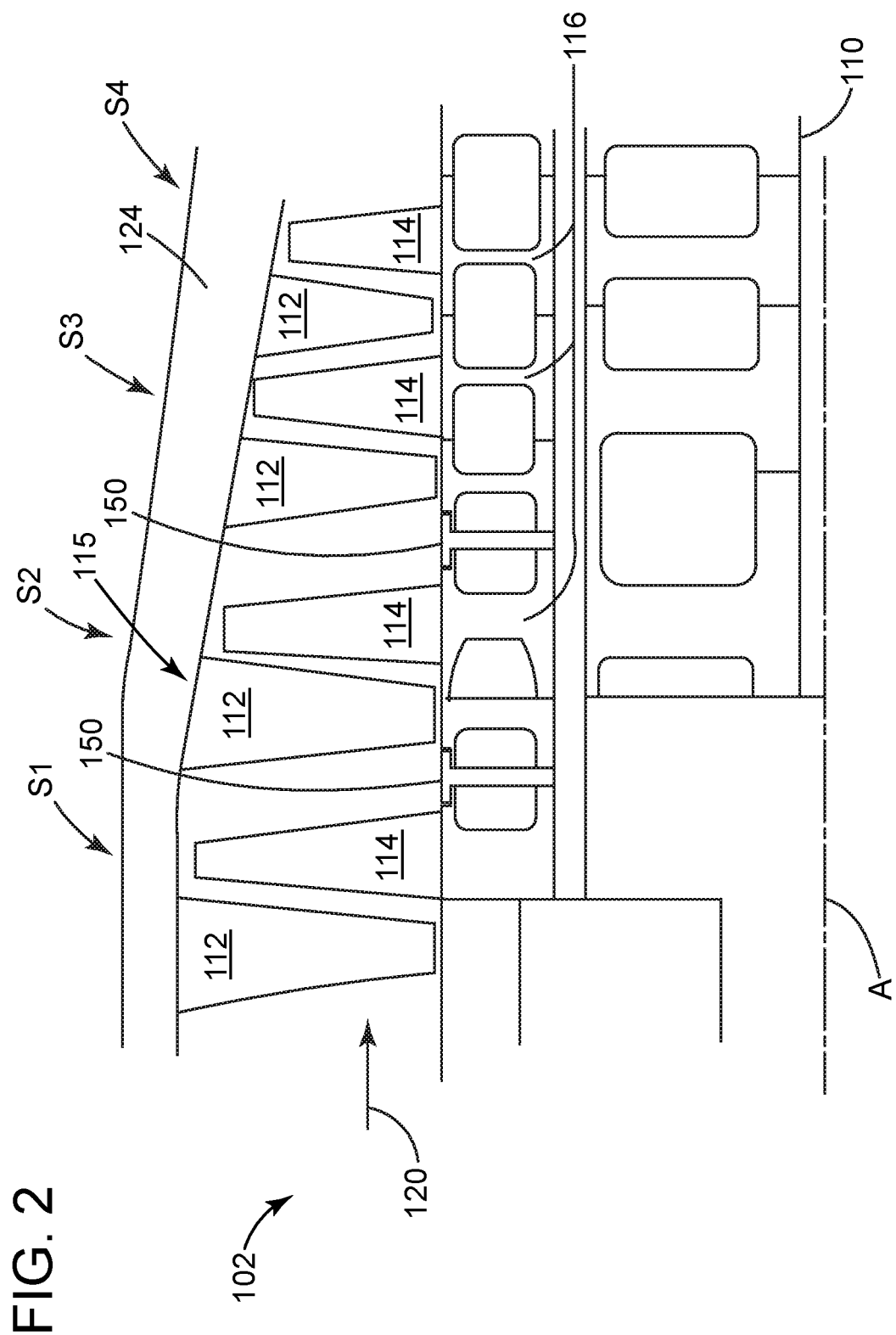
FIG. 2 shows a cross-sectional view of a portion of an illustrative compressor, according to embodiments of the disclosure.

FIG. 2 shows a cross-sectional view of an illustrative portion of axial compressor 102 of turbomachine 90 (FIG. 1). In the example shown, compressor 102 includes four compressor blade stages S1-S4 arranged along an axis A, i.e., an axis of rotor 110. Each compressor blade stage includes a plurality of compressor blades 114 (hereafter "blades 114") circumferentially mounted to rotor 110 by a rotor disk 116. That is, blades 114 in each stage are mechanically coupled to rotor 110 by a respective rotor disk 116. Rotor disk 116 couples the blades in a circumferentially spaced manner to rotor 110. The four stages are referred to as S1, S2, S3, S4. Stage 1 is the first stage and is the largest (in a radial direction) of the four stages. Stage 2 is the second stage and is the next stage in an axial direction. Stage 3 is the third stage and is the next stage in an axial direction. Stage 4 is the fourth, last stage and is the smallest (in a radial direction). It is to be understood that four stages are shown as one example only, and each turbomachine may have more or less than four stages.

Stages may include only rotating compressor blades 114, or, as shown, a plurality of stationary vanes or vanes 112 may cooperate with compressor blades 114 to form each stage 1-4 of turbomachine 90 (FIG. 1) and to define a portion of a working fluid flowpath through turbomachine 90 (FIG. 1). A static vane section 115 includes a plurality of stationary vanes 112 circumferentially spaced around rotor 110 and coupled to static casing 124. A spacer 150 (having a body) may be located adjacent a blade stage, e.g., stage 1 and/or stage 2 in the example shown in FIG. 2. As will be described herein, each spacer 150 is axially adjacent a platform of a blade 114 in turbomachine 90. Spacers 150 may simply be positioned between platforms 136 (FIG. 3), or they may include a gas path-facing surface forming a portion of an annulus for a working fluid flowpath through turbomachine 90. Spacers 150 may not be necessary adjacent each stage of blades 114.

During operation, rotor disk 116 and blades 114 rotate about axis A of compressor 102 while stator vanes 112 remain stationary. In this manner, blades 114 cooperate with adjacent stator vanes 112 to impart kinetic energy to and compress the incoming flow of air 120, which is then delivered to combustor 104 (FIG. 1). Other types of compressor configurations may be used.

With reference to FIGS. 1 and 2, in operation, air flows through compressor 102, and pressurized air is supplied to combustor 104. Specifically, the pressurized air is supplied to fuel nozzle section 106 that is integral to combustor 104. Fuel nozzle section 106 is in flow communication with combustion region 105. Fuel nozzle section 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy by directing the combusted fuel, e.g., working fluid, into the working fluid flowpath to turn blades 114. Vanes 112, and spacers 150 (where provided), define the working fluid flowpath. Turbine 108 is rotatably coupled to and drives rotor 110. Compressor 102 is rotatably coupled to rotor 110. At least one end of rotor 110 may extend axially away from turbomachine 90 and may be attached to a load or machinery (not shown), such as, but not limited to, a generator, a load compressor, and/or another turbine.

Figure 3:
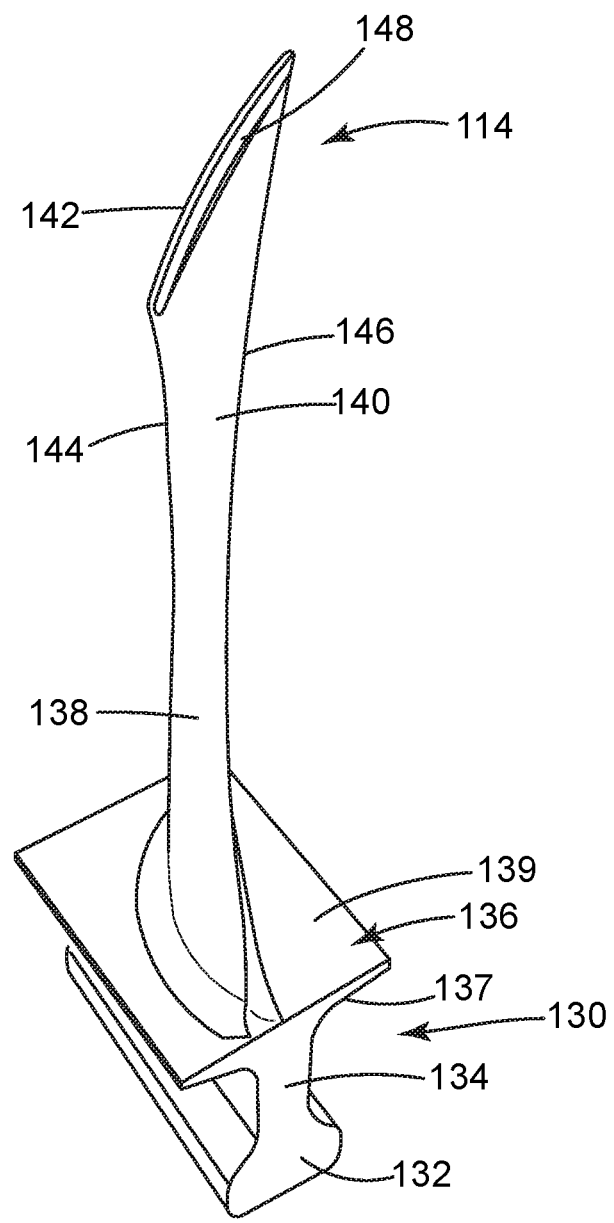
FIG. 3 shows a perspective view of an illustrative turbomachine blade, according to embodiments of the disclosure.

FIG. 3 shows a perspective view of a blade 114 of the type for which embodiments a vibration-damping system 128 (FIG. 4) of the present disclosure may be employed. Each of the plurality of blades 114 may include a root or base 130 by which blade 114 attaches to rotor 110 (FIG. 1) using a rotor disk 116 (FIG. 2). Base 130 may include a dovetail 132 configured for mounting in a corresponding dovetail slot in the perimeter of rotor disk 116 (FIGS. 2 and 4) of rotor 110 (FIG. 1). Base 130 may further include a shank 134 that extends between dovetail 132 and a platform 136, which is disposed at the junction of airfoil body 138 and base 130 and defines a portion of the inboard boundary of the working fluid flowpath (FIG. 2) through turbomachine 90. Each platform 136 includes a radially inner surface 137 and a radially outer (gas path-facing) surface 139.

It will be appreciated that airfoil body 138 is the active component of blade 114 that intercepts the flow of working fluid. It will be seen that airfoil body 138 of blade 114 may include a concave pressure side (PS) outer wall 140 and a circumferentially or laterally opposite convex suction side (SS) outer wall 142 extending axially between opposite leading and trailing edges 144, 146, respectively. Sidewalls 140 and 142 also extend in the radial direction from platform 136 to an outer tip 148. Hence, airfoil body 138 extends from platform 136 to outer tip 148. Blade 114 may also include a part-span shroud (not shown) extending from each outer wall 140, 142. As understood, part-span shrouds may be located along a radial span of blade 114 and may interact or mate with a part-span shroud of an adjacent blade to, among other things, reduce vibrations in each blade 114. While an illustrative blade 114 has been described, it will be appreciated that blades may vary in structure across different types of turbomachines.

As noted, during operation of a turbomachine, blades 114 may be excited into vibration by a number of different forcing functions. Variations in, for example, working fluid temperature, pressure, and/or density, can excite vibrations throughout the rotor assembly, especially within the blade airfoils 138 and/or outer tips 148. Gas exiting upstream of the turbine and/or compressor sections in a periodic, or "pulsating," manner can also excite undesirable vibrations. Embodiments of the disclosure aim to reduce the vibration of a large rotating turbomachine blade 114 without significant change of blade physical structure.

Figure 4:
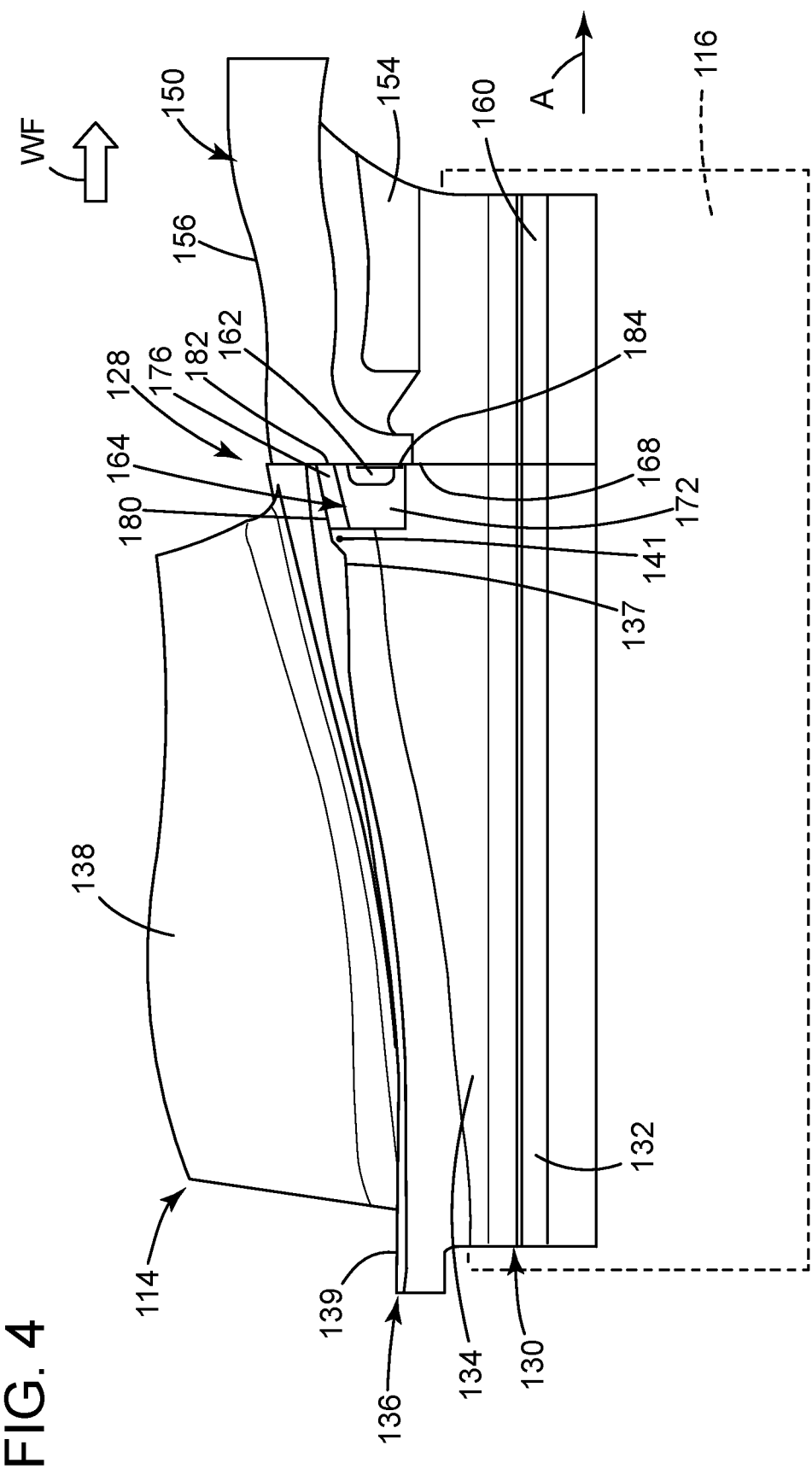
FIG. 4 shows a circumferential side view of a vibration-damping system for turbomachine blade(s), according to embodiments of the disclosure.
Figure 6:
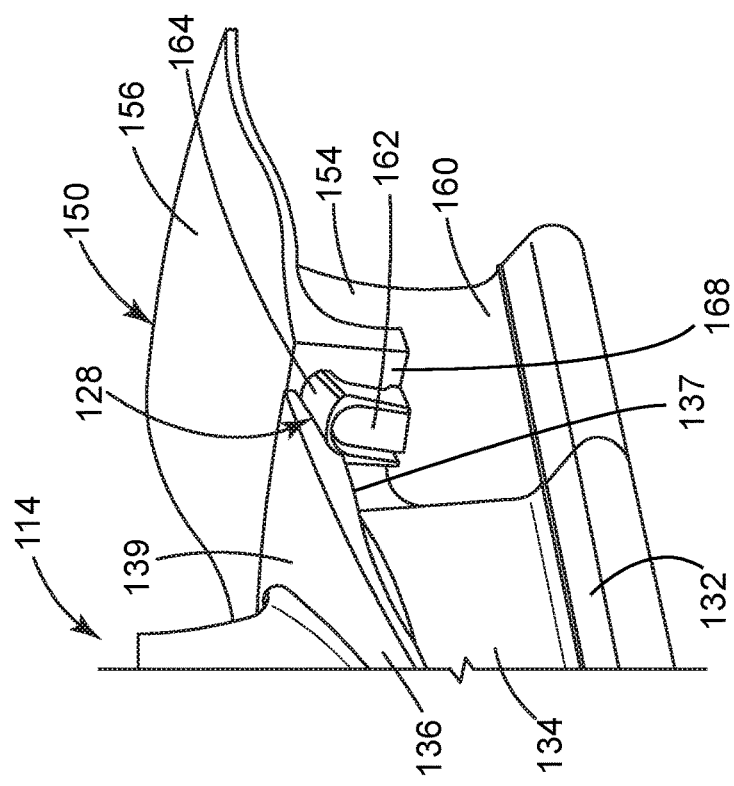
FIG. 6 shows an enlarged perspective view of the blade with vibration-damping system, according to embodiments of the disclosure.
Figure 5:
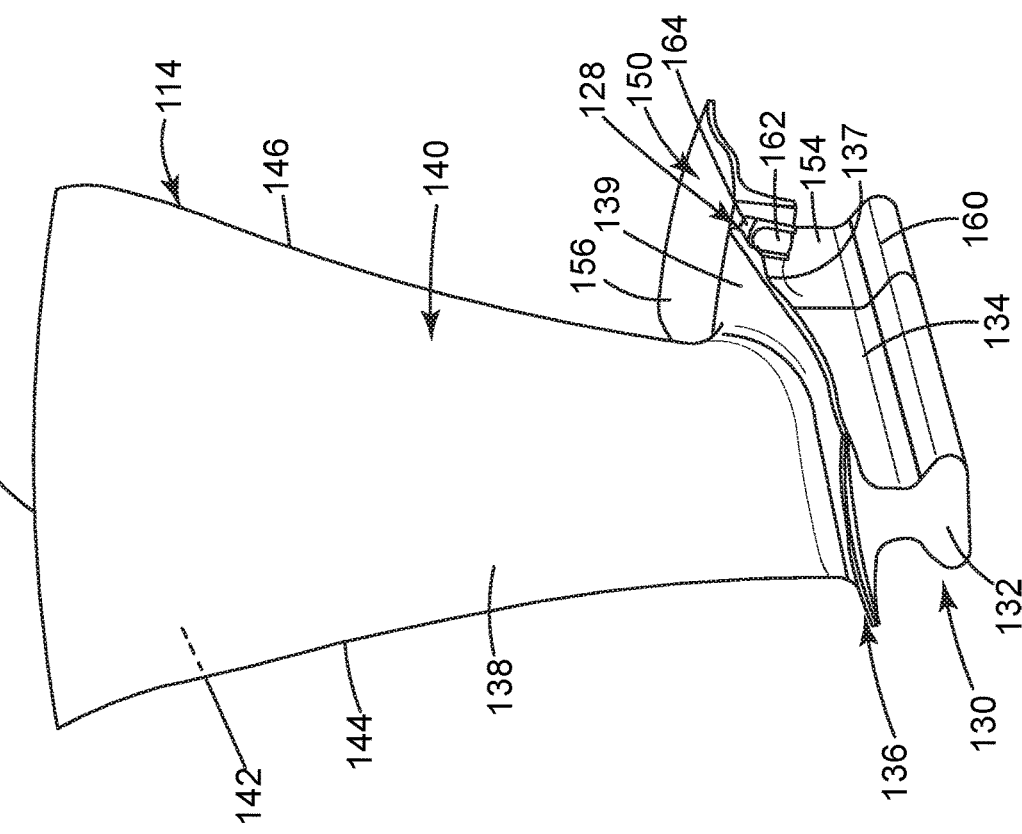
FIG. 5 shows a perspective view of a blade with a vibration-damping system, according to embodiments of the disclosure.

FIG. 4 shows a circumferential side view of a vibration-damping system 128 (hereafter "system 128") for at least one turbomachine blade 114 in turbomachine 90, e.g., compressor blades within compressor 102. FIG. 5 shows a perspective view, and FIG. 6 shows an enlarged perspective view of system 128 including blade 114 and spacer 150. As noted, each turbomachine blade 114 has platform 136 including radially inner surface 137. In one example, shown best in an axial view without spacer 150 in FIG. 7, radially inner surface(s) 137 of platform(s) 136A and/or 136B may be positioned in a recess 141 within platform 136. However, recess 141 may be not be necessary in all instances.

System 128 includes spacer 150 axially adjacent platform 136 of turbomachine blade(s) in turbomachine 90, i.e., adjacent a turbomachine blade stage. Spacer 150 includes a body 154. Spacer 150 also may include a gas path-facing surface 156 on body 154 forming a portion of an annulus (into and out of page) for a working fluid flowpath (arrow WF). That is, spacer 150 is adjacent platform 136 and creates part of the annulus to define working fluid flowpath WF adjacent blade(s) 114. Spacer 150 may also be referred to as an annulus filler. In other embodiments, spacer 150 may not include gas path-facing surface 156 and may be positioned instead radially inward of a platform 136 of a blade 114. In any event, spacer 150 may have any circumferential or axial extent desired. Spacer 150 is typically devoid of any structure in working fluid flowpath. Spacer 150 may also include a dovetail 160 on body 154 for coupling to rotor disk 116 (disk shown in phantom in FIG. 4).

System 128 in accordance with embodiments of the disclosure may also include spacer 150 having a vibration-damping element coupler 162 (hereafter "coupler 162") on body 154 and a vibration-damping element 164 (hereafter "element 164") configured to couple to coupler 162. As illustrated in FIGS. 4-7, element 164 and coupler 162 are disposed to cause element 164 to engage radially inner surface 137 of platform 136 of turbomachine blade(s) 114 to dampen vibration of turbomachine blade(s) 114, e.g., during operation of turbomachine 90 (FIG. 1). Element 164 may engage with a single turbomachine blade 114 (see e.g., FIG. 4-6).

Figure 7:
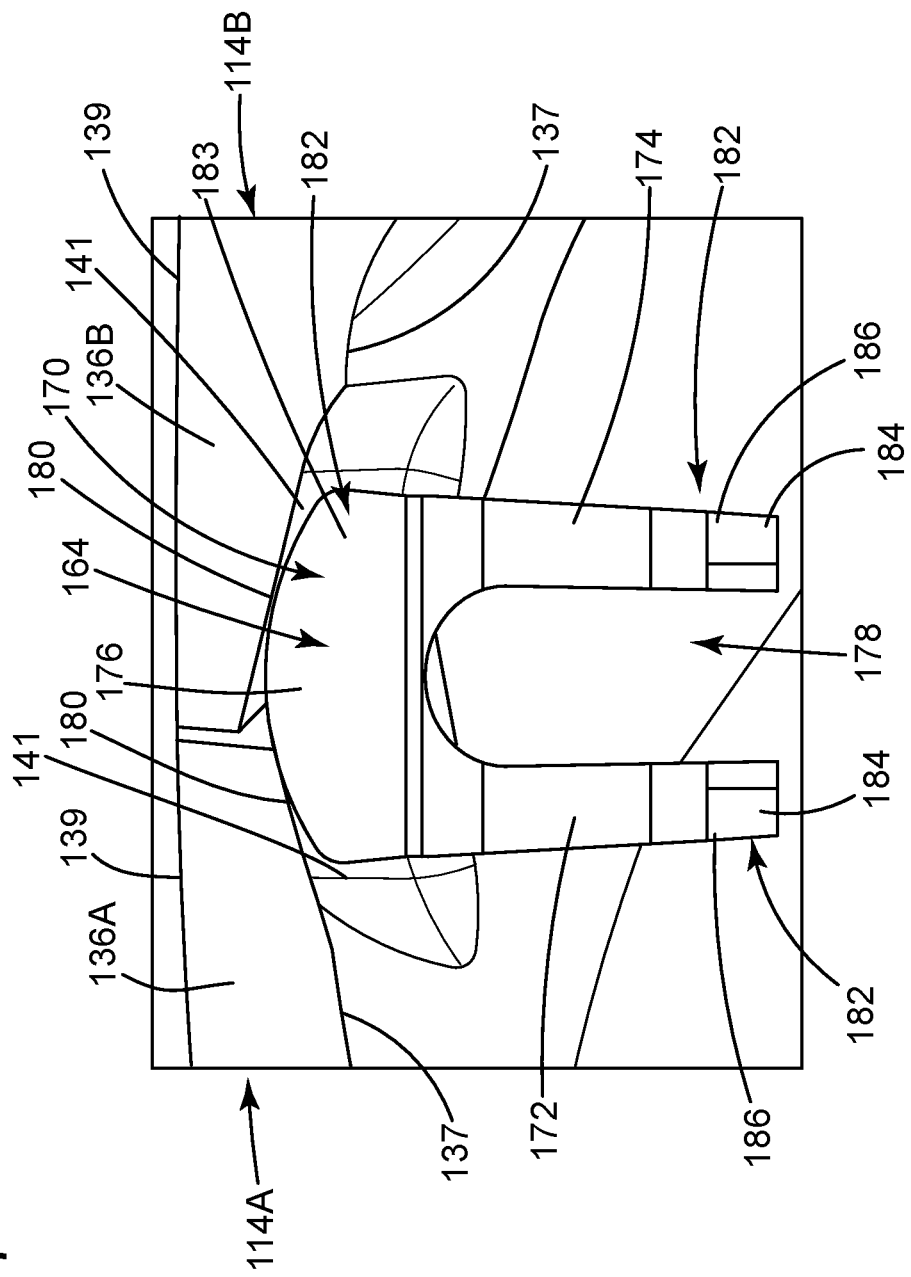
FIG. 7 shows an enlarged end view of a vibration-damping element, according to embodiments of the disclosure.

However, as shown in FIG. 7, element 164 typically engages a pair of circumferentially adjacent turbomachine blades 114A, 114B. In this case, radial inner surfaces 137 of platforms 136A, 136B of the pair of circumferentially adjacent turbomachine blades 114A, 114B are adjacent to one another in turbomachine 90. Here, element 164 and damping element coupler 162 are disposed to cause element 164 to engage radially inner surfaces 137 of platforms 136A, 136B of each of the pair of circumferentially adjacent turbomachine blades 114A, 114B to dampen vibration of the pair of circumferentially adjacent turbomachine blades 114A, 114B. In this manner, vibrations in both blades 114A, 114B are damped simultaneously.

Element 164 and coupler 162 can take a variety of forms depending on, for example, the blades used, the shape of platforms 136, the spacing between spacer and blades, etc. Accordingly, the particular examples illustrated and described herein are not to be considered limiting other than as claimed herein.

Figure 8:
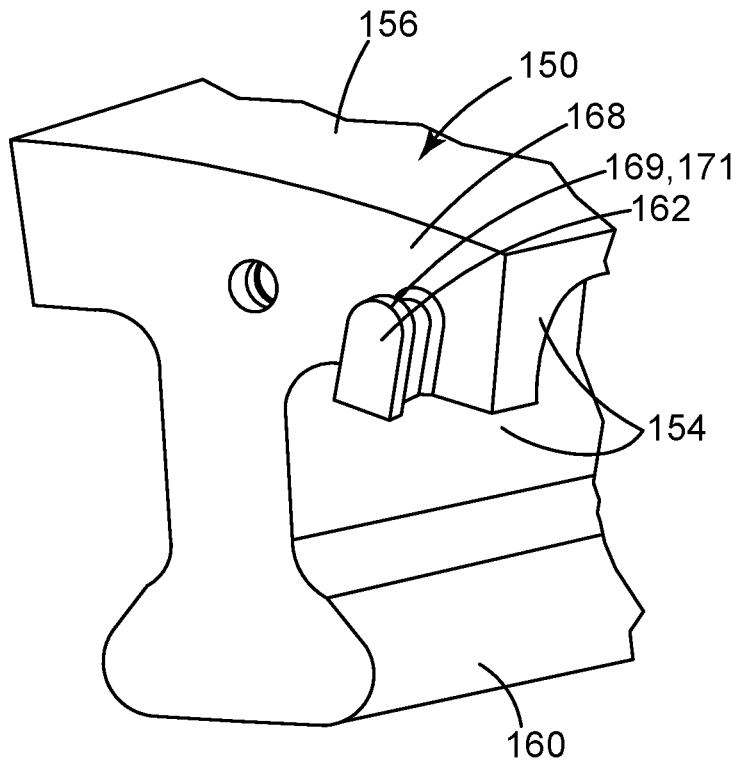
FIG. 8 shows an enlarged perspective view of a spacer, according to embodiments of the disclosure.

In the embodiment shown in FIGS. 4, 6, and the enlarged perspective view of FIG. 8, coupler 162 may extend from an axial surface 168 of body 154 of spacer 150. Axial surface 168 can be any axially facing surface of spacer 150 sufficiently close to blade(s) 114. Coupler 162 may extend in any direction necessary to position element 164 in the desired location. Axial surface 168 may provide a bearing surface for engaging with element 164.

In one example, as shown best in FIG. 7, element 164 includes a U-shaped body 170 configured to seat on coupler 162 (FIGS. 4-6, 8). More particularly, element 164 may include U-shaped body 170 having a first leg 172 and a second leg 174 extending from a base portion 176 that couples first and second legs 172, 174. In this manner, U-shaped body 170 defines a receiver 178 for coupling the U-shaped body 170 to coupler 162 disposed on body 154 of spacer 150 axially adjacent blade(s) 114, e.g., pair of circumferentially adjacent turbomachine blades 114A, 114B in turbomachine 90.

Coupler 162 may include any appropriate shape to position element 164. For example, as shown in the enlarged perspective view of FIG. 8, coupler 162 may include a surface 169 configured to receive element 164 thereon. For example, it may have a rounded surface shaped to complement receiver 178. Any form of holder and/or fastener may be employed to hold element 164 to coupler 162. In the example shown, surface 169 also creates a lip 171 to (axially) hold element 164.

Element 164 may include a number of bearing surfaces that engage blade(s) 114 and spacer 150 to frictionally arrest vibrations through spacer 150 to rotor disk 116 and between blades. For example, as shown best in FIG. 7, element 164 may include a (first) bearing surface 180 on base portion 176 configured to engage with radially inner surface(s) 137 of platform(s) 136 of blade(s) 114 to dampen vibration of the blade(s). For example, in FIG. 7, both radially inner surfaces 137 are engaged by bearing surface 180. As shown best in FIG. 4, bearing surface 180 may be at a non-parallel angle α relative to a rotor axis A of turbomachine 90. Angle α may be at any angle desired to foster application of pressure on radially inner surface(s) 137 of blade(s) 114 during operation of turbomachine 90, e.g., via centrifugal force. Angle α may also aid in creating a desired axial spacing between blade(s) 114 and spacer 150. Angle α may also be such that bearing surface 180 is parallel to rotor axis A of turbomachine 90, if desired.

As shown in FIGS. 4 and 7, element 164 may also include another (second) bearing surface 182 configured to engage axially with body 154, e.g., with axial surface 168 (FIG. 4) of body 154 of spacer 150. As shown best in FIG. 7, bearing surface 182 may include a radially outer surface 183 and a spaced radially inner surface 184. Radially inner surface 184 may be at an end 186 of each of first and second legs 172, 174. Radially outer surface 183 may be on base portion 176. Each of radially outer and radially inner surfaces 183, 184 of second bearing surface 182 are configured to engage axially with body 154 of spacer 150, e.g., to allow proper positioning of bearing surface 182 and/or to provide additional vibration damping of blade(s) 114. Bearing surfaces 184 are configured to engage with axial surface 168 (FIG. 4) of body 154 of spacer 150 at a positon radially inward from radially outer bearing surface 183.

While particular bearing surfaces have been illustrated herein, it is recognized that element 164 may have a wide variety of alternative shapes to provide different bearing surfaces. For example, all of bearing surface 182 of element 164 axially facing spacer 150 may be a contiguous bearing surface capable of engaging axial surface 168 of body 154. In any event, vibrations can be directed into spacer 150 and to rotor disk 116 (FIG. 4) coupled to rotor 110 (FIG. 1), i.e., to ground.

Vibration damping system 128 and the parts thereof can be formed using any now known or later developed manufacturing process, e.g., casting, machining and/or additive manufacture. For example, element 164 and/or spacer 150 including coupler 162, can be additively manufactured.

Figure 9:
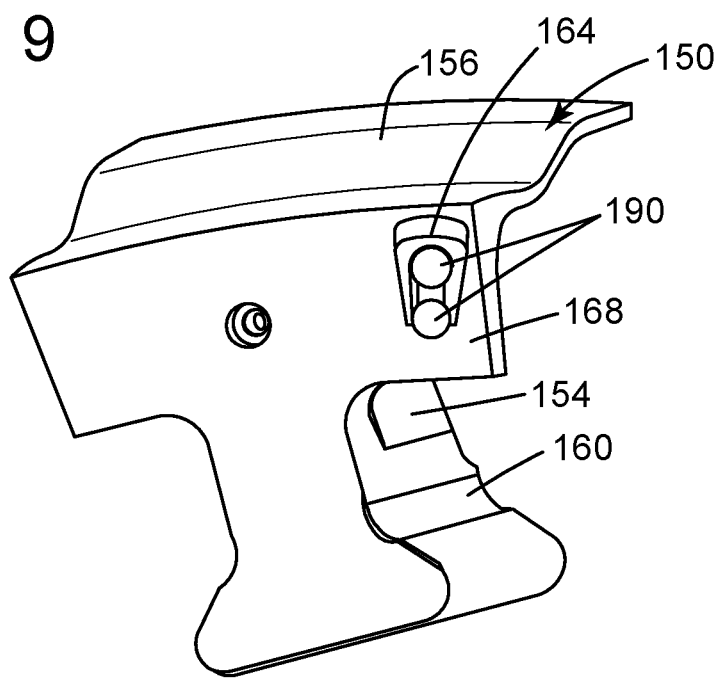
FIG. 9 shows an enlarged perspective view of a spacer, according to other embodiments of the disclosure.

Vibration damping system 128 can also be added or retrofitted to spacers 150 and blades 114 that have already been used but that are not necessarily ready for replacement. In this case, coupler 162, for example, may take a variety of alternative forms. For instance, as shown in the enlarged perspective view of spacer 150 in FIG. 9, coupler 162 may alternatively include a number of bolts 190 coupled to body 154 of spacer 150, e.g., extending axial surface 168. In any event, coupler 162 can be coupled to body 154 in any manner. In one example, coupler 162 may be formed integrally with body 154 of spacer 150, e.g., via additive manufacture. Alternatively, coupler 162 can be later coupled to body 154 of spacer 150, e.g., welded to spacer 150, fastened to spacer 150, threaded into spacer 150 (see e.g., bolts 190 in FIG. 9), etc. In this latter case, a previously used spacer 150 can be retrofitted for use in a vibration damping system 128 by adding coupler 162, according to embodiments of the disclosure. Although not necessary in all cases, used blade(s) 114 could also be machined to form recesses 141 (FIG. 7) in platform 136 thereof, if desired.

A method according to embodiments of the disclosure may include coupling element 164 to body 154 of spacer 150 axially adjacent blade(s) 114, such as a pair of circumferentially adjacent blades 114A, 114B (FIG. 7) in turbomachine 90 (FIG. 2). Element 164 extends adjacent to radially inner surface 137 of each platform 136 of blade(s) 114, e.g., pair of circumferentially adjacent blades 114A, 114B (FIG. 7). In an inoperative state of turbomachine 90, bearing surface 180 may be spaced from radially inner surface 137 of platform 136, e.g., to allow easier installation of element 164. During operation of turbomachine 90, damping vibration of blade(s) 114 occurs by engaging element 164 to radially inner surface 137 of each platform 136 of blade(s) 114 and engaging vibration-damping element 164 to body 154 of spacer 150 axially adjacent blade(s) 114. Where vibration damping system 128 is applied to a pair of circumferentially adjacent turbomachine blades 114A, 114B, as shown in FIG. 7, damping vibration of pair of circumferentially adjacent blade(s) 114A, 114B (FIG. 7) occurs by engaging vibration-damping element 164 to radially inner surfaces 137 of each platform 136A, 136B of pair of circumferentially adjacent turbomachine blades 114A, 114B and engaging vibration-damping element 164 to body 154 of spacer 150 of axially adjacent blade(s) 114. Here, blade-to-blade vibrations are damped.

While embodiments of the disclosure have been described herein relative to a blade that is part of a compressor, it is noted that the teachings of the disclosure may be applied to a variety of other applications for an article including an airfoil, e.g., turbine section 108 (FIG. 1), jet engines, steam turbines, and other turbomachines. Further, while embodiments of the disclosure have been illustrated relative to spacer 150 that is aft or downstream of blade(s) 114, it is recognized that the teachings of the disclosure can be readily applied to blade(s) 114 where spacer is forward or upstream thereof, e.g., by placing coupler 162 on an axially rearward facing surface rather than an axially forward facing axial surface 168 of body 154 of spacer 150.

Embodiments of the disclosure provide mechanical (friction) damping, spanning the under-platform surfaces of blade(s) 114 and supported by a feature on the adjacent spacer 150. Vibration damping system 128 performs as both a blade-to-blade and blade-to-ground damper. Consequently, system 128 dissipates energy in the form of friction/heat from both synchronous and non-synchronous stimuli, thus reducing vibratory stress and increasing damage tolerance. Vibration damping system 128 may reduce vibratory stresses to acceptable levels (for blades responding above an allowable level) and/or may increase damage tolerance (by further reducing vibratory stress) on blades already meeting allowable vibratory stress limits. The attachment method of element 164 to rotor disk 116 via spacer 150 allows for a simple assembly/disassembly with deterministic and repeatable contact behavior. In addition, the vibration-damping element 164 geometry and blade(s) 114 under-platform interface (e.g., radially inner surface 137) can be readily modified to customize the vibration damping characteristics.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A vibration-damping system for at least one turbomachine blade in a turbomachine, each turbomachine blade having a platform having a radially inner surface, the system comprising:
   a spacer axially adjacent the platform of the at least one turbomachine blade in the turbomachine, the spacer including a body;
   a damping element coupler positioned on the body of the spacer; and
   a vibration-damping element configured to couple to the damping element coupler, the vibration-damping element including a first bearing surface configured to engage with the radially inner surface of the platform of the at least one turbomachine blade and a second bearing surface configured to engage axially with the body of the spacer to dampen vibration of the at least one turbomachine blade,
   wherein the vibration-damping element and the damping element coupler are disposed to cause the vibration-damping element to engage the radially inner surface of the platform of the at least one turbomachine blade to dampen vibration of the at least one turbomachine blade.

2. The system of claim 1, wherein the at least one turbomachine blade includes a pair of circumferentially adjacent turbomachine blades, wherein the radial inner surfaces of the platforms of the pair of circumferentially adjacent turbomachine blades are adjacent to one another in the turbomachine; and wherein the vibration-damping element and the damping element coupler are disposed to cause the vibration-damping element to engage the radially inner surfaces of the platforms of each of the pair of circumferentially adjacent turbomachine blades to dampen vibration of the pair of circumferentially adjacent turbomachine blades.

3. The system of claim 1, wherein the damping element coupler extends from an axial surface of the body of the spacer.

4. The system of claim 1, wherein the vibration-damping element includes a U-shaped body configured to seat on the damping element coupler.

5. The system of claim 1, wherein the second bearing surface includes a radially outer surface and a spaced radially inner surface, wherein each of the radially outer and radially inner surfaces of the second bearing surface is configured to engage axially with the body of the spacer.

6. The system of claim 1, wherein the first bearing surface extends at an angle relative to a rotor axis of the turbomachine.

7. The system of claim 1, wherein, in an inoperative state of the turbomachine, the first bearing surface is spaced from the radially inner surface of the platform.

8. The system of claim 1, wherein the radially inner surface of the platform is positioned in a recess within the platform.

9. The system of claim 1, wherein the damping element coupler includes at least one bolt integral with the body of the spacer.

10. A spacer for positioning adjacent a turbomachine blade stage in a turbomachine, the spacer comprising:
a body;
a dovetail on the body;
a vibration-damping element coupler on the body, the vibration-damping element coupler disposed to position a vibration-damping element to engage a radially inner surface of a platform of at least one turbomachine blade in the turbomachine blade stage to dampen vibration of the at least one turbomachine blade; and
a bearing surface on an axial surface of the body for engaging with the vibration-damping element.

11. The spacer of claim 10, wherein the at least one turbomachine blade includes a pair of circumferentially adjacent turbomachine blades; and
wherein the vibration-damping element coupler is disposed to cause the vibration-damping element to engage the radially inner surfaces of the platforms of each of the pair of circumferentially adjacent turbomachine blades to dampen vibration of the pair of circumferentially adjacent turbomachine blades.

12. The spacer of claim 10, wherein the vibration-damping element coupler extends from an axial surface of the body.

13. The spacer of claim 10, wherein the vibration-damping element coupler includes a surface configured to receive a U-shaped vibration-damping element thereon.

14. The spacer of claim 10, wherein the vibration-damping element coupler includes at least one bolt integral with a body of the spacer.

15. A vibration-damping element for a pair of circumferentially adjacent turbomachine blades in a turbomachine, each turbomachine blade having a platform having a radially inner surface, the vibration-damping element comprising:
a U-shaped body having a first leg and a second leg extending from a base portion that couples the first and second legs, the U-shaped body defining a receiver for coupling the U-shaped body to a damping element coupler disposed on a body of a spacer axially adjacent the pair of circumferentially adjacent turbomachine blades in the turbomachine, the damping element coupler having a rounded surface shaped to complement the receiver; and
a first bearing surface on the base portion and configured to engage with the radially inner surfaces of each turbomachine blade,
wherein the first bearing surface is oriented at a non-parallel angle relative to a rotor axis of the turbomachine.

16. The vibration-damping element of claim 15, further comprising a second bearing surface including a radially outer surface and a spaced radially inner surface, wherein each of the radially outer and radially inner surfaces of the second bearing surface is configured to engage axially with the body of the spacer.

* * * * *